United States Patent [19]

Abe

[11] Patent Number: 4,672,936
[45] Date of Patent: Jun. 16, 1987

[54] INTAKE AIR CONTROL SYSTEM FOR AN AUTOMOTIVE ENGINE

[75] Inventor: Kunihiro Abe, Higashimurayama, Japan

[73] Assignee: Fuji Jukogyo Kabushiki Kaisha, Tokyo, Japan

[21] Appl. No.: 789,878

[22] Filed: Oct. 21, 1985

[30] Foreign Application Priority Data

Oct. 26, 1984 [JP] Japan .................................. 59-226255

[51] Int. Cl.⁴ ............................................... F62D 9/02
[52] U.S. Cl. .................................... 123/239; 123/588
[58] Field of Search .............................. 123/339, 588

[56] References Cited

U.S. PATENT DOCUMENTS 4,289,100  9/1981  Kinugawa et al. ................. 123/339
4,414,943  11/1983  Nagase .............................. 123/588

*Primary Examiner*—William A. Cuchlinski, Jr.
*Attorney, Agent, or Firm*—Martin A. Farber

[57] ABSTRACT

A system for controlling the amount of intake air of an engine at cold engine operation. A control valve is provided in a bypass around a throttle valve of the engine. The opening degree of the control valve is determined by the opening degree of the throttle valve. When the throttle valve is closed to a position near a throttle valve closed position, the control valve is gradually closed.

7 Claims, 7 Drawing Figures

INTAKE AIR CONTROL SYSTEM FOR AN AUTOMOTIVE ENGINE

BACKGROUND OF THE INVENTION

The present invention relates to a system for controlling the amount of intake air in an automotive engine, and more particularly to a system for controlling the intake air at rapid closing of a throttle valve of the engine.

When the throttle valve closes rapidly after the driver releases the accelerator pedal, air-fuel mixture can be momentarily excessively enriched. This causes an increase of the hydrocarbon and carbon monoxide content in the exhaust gases. To prevent this increase of the pollutants, the motor vehicle is equipped with a dashpot or a control valve in a bypass around the throttle valve.

The dashpot is adapted to prevent the throttle valve from rapidly closing. The control valve is arranged so as to slowly close to control the amount of intake air so as to prevent excessive enrichment of the air-fuel mixture. On the other hand, pollution of the exhaust gases by rapid closing of the throttle valve is aggravated during the warming up operation of the engine. However, if the intake air control systems are designed so as to prevent the enrichment in accordance with conditions during warming up, the driveability of the vehicle deteriorates at normal operating temperature. Accordingly, it is difficult to provide an intake air control system which may resolve this inconsistent problem.

SUMMARY OF THE INVENTION

The object of the present invention is to provide a valve control system which may reduce pollutants in exhaust gases without decreasing the driveability of a motor vehicle at normal operating temperature.

To this end, according to the present invention, there is provided a system for controlling the intake air in an automotive engine having an intake passage, and a throttle value in the intake passage. The system further comprises a control valve provided in the intake passage to control the amount of intake air, actuating means for operating the control valve, means for detecting the temperature of a coolant of the engine and for producing a temperature signal when the temperature is lower than a predetermined value, and means for detecting the position of the throttle valve and for producing a throttle position signal when the throttle valve is closed to a position near a throttle valve closed position. The actuator actuates the control valve in response to the temperature signal and to the throttle position signal in such a manner that the control valve is held in open state for a predetermined period dependent on the temperature, and thereafter the valve is closed.

The other objects and features of this invention will become understood from the following description with reference to the accompanying drawings.

DETAILED DESCRIPTION OF THE PREFERRED EMBODIMENT

Figure 1:
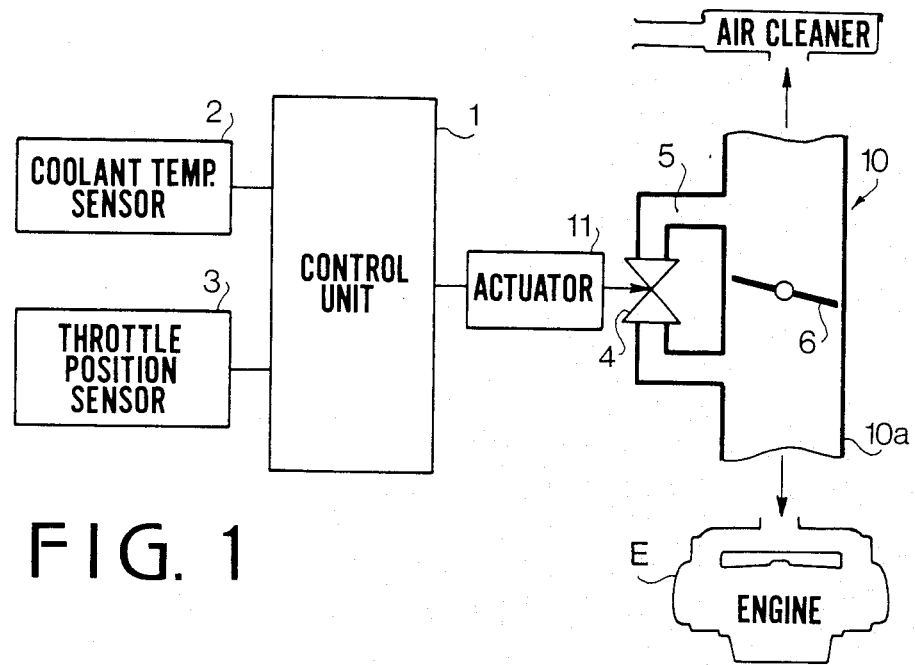
FIG. 1 is a schematic diagram of a system according to the present invention.

Referring to FIG. 1 showing a system of the invention, a throttle body 10 defines an intake passage 10a. A bypass 5 is formed in the throttle body around a throttle valve 6 provided in the intake passage. A control valve 4 is provided in the bypass 5 so as to control the amount of the a part of intake air induced into an engine E. The system is provided with an electronic control unit 1 which is applied with a signal from a coolant temperature sensor 2 and with a signal from a throttle position sensor 3. The output of the control unit is applied to an actuator 11, such as a solenoid, which operates the control valve 4.

Figure 2:
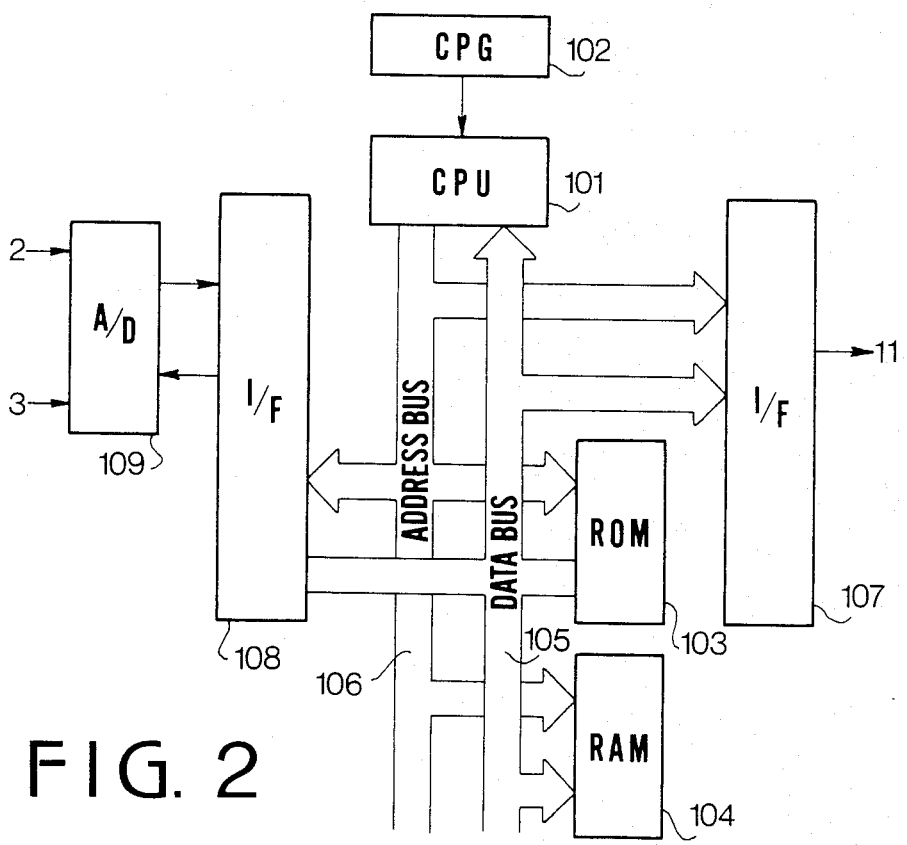
FIG. 2 is a block diagram showing a control unit used in the system.

Referring to FIG. 2 showing the construction of the control unit 1, the unit is provided with a ROM 103 storing an operating program, a RAM 104 for storing data, a CPU 101 for executing the operating program stored in the ROM 103, a data bus 105, an address bus 106, and a clock pulse generator 102. Signals from the coolant temperature sensor 2 and throttle position sensor 3 are applied to the control unit through an A/D convertor 109 an input interface 108. The output signal of the control unit is applied to the actuator 11 for actuating the control valve 4 through an output interface 107.

Figure 3:
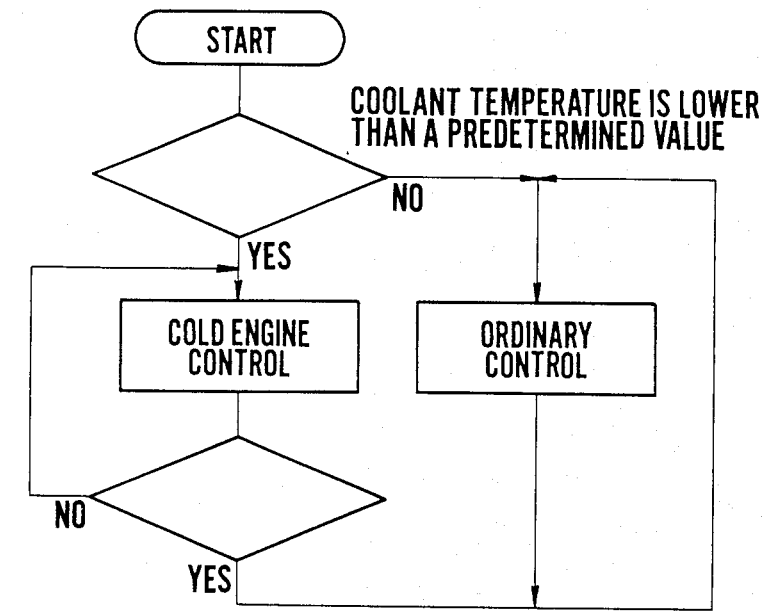
FIG. 3 is a flowchart showing the operation of the system.

FIG. 3 shows the control operation of the control valve. At the start of the engine, when the temperature of the coolant is below a predetermined value, the control valve is controlled in accordance with a cold engine control program until the engine warms up.

Figure 4:
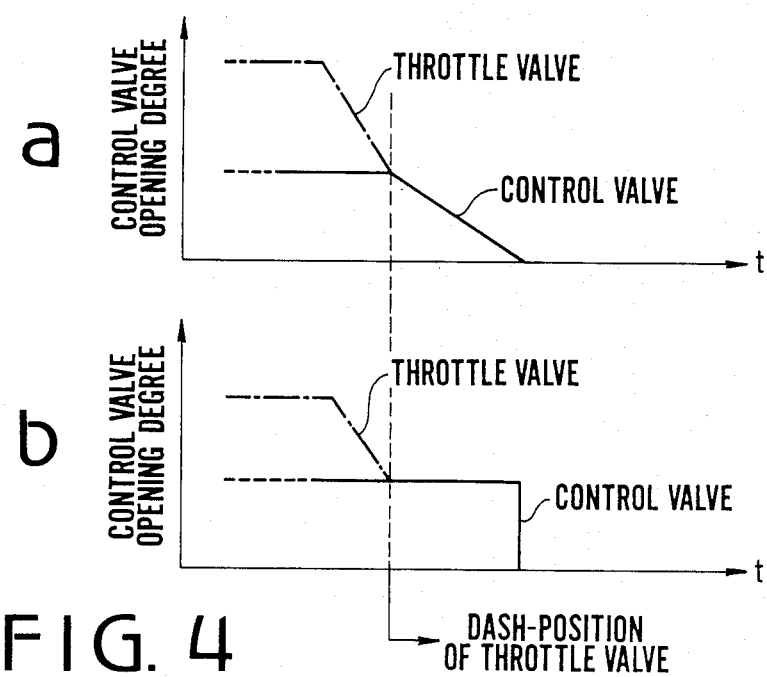
FIGS. 4a and 4b are graphs showing opening degrees of a control valve.

FIG. 4(a) shows the ordinary control operation of the control valve and FIG. 4(b) shows the cold engine control operation. In the ordinary control operation, the control valve 4 is gradually closed after the throttle valve closes to a dash-position near a throttle valve closed position. That is, the dash-position corresponds to a dashpot operating position in the conventional dashpot. In FIG. 4, the chain line shows the movement of the throttle valve and the solid line shows the closing operation of the control valve.

At the cold engine control operation, the control valve is held in an opening degree for a period depending on the coolant temperature after the throttle valve closes to the dash-position (idle opening position of the throttle valve). Then the valve is closed as shown in FIG. 4(b). If the engine warms up within the period, the cold engine control operation is changed to the ordinary control operation.

Figure 5:
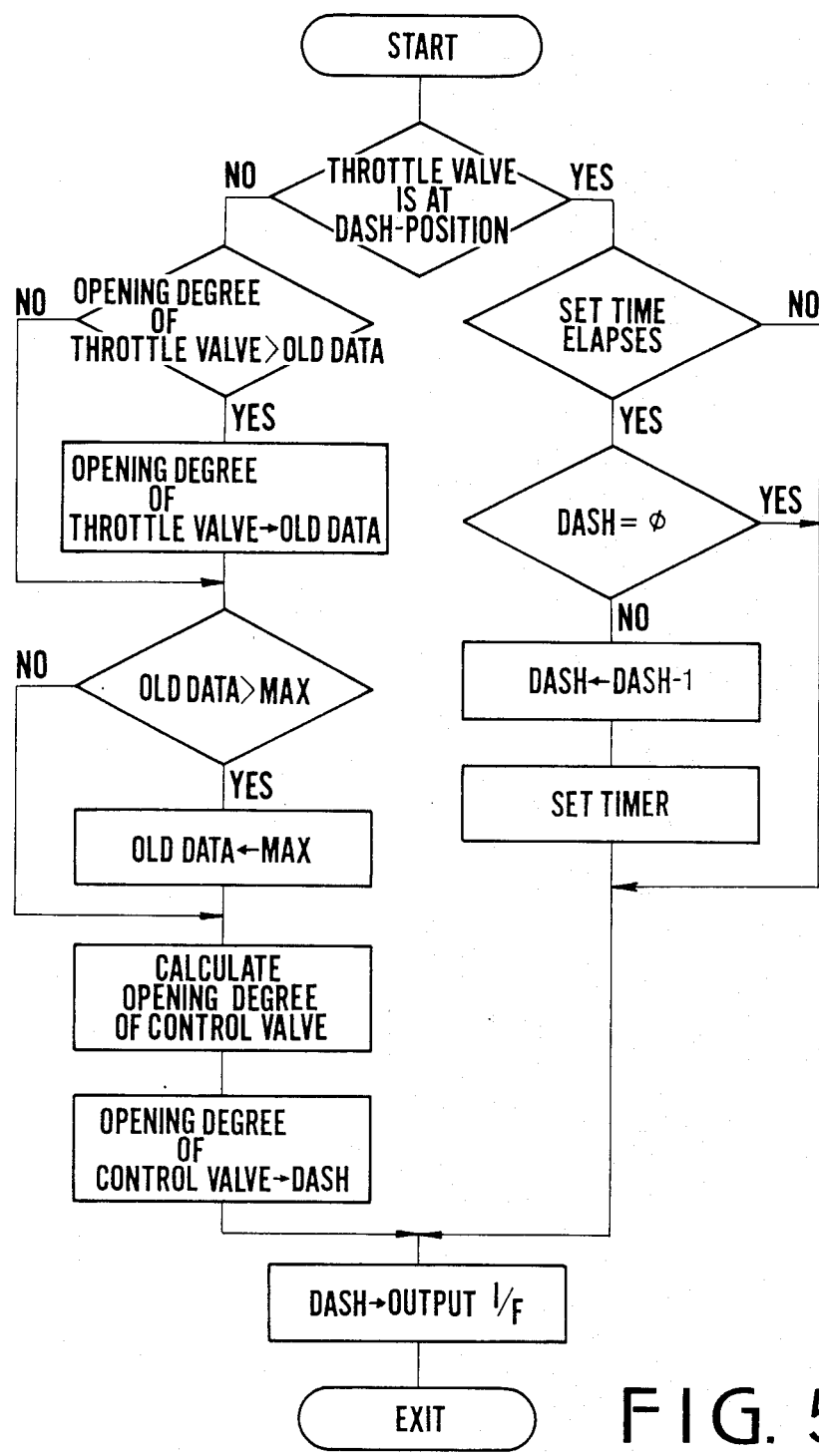
FIGS. 5 and 6 are flowcharts showing value control operations.
Figure 6:
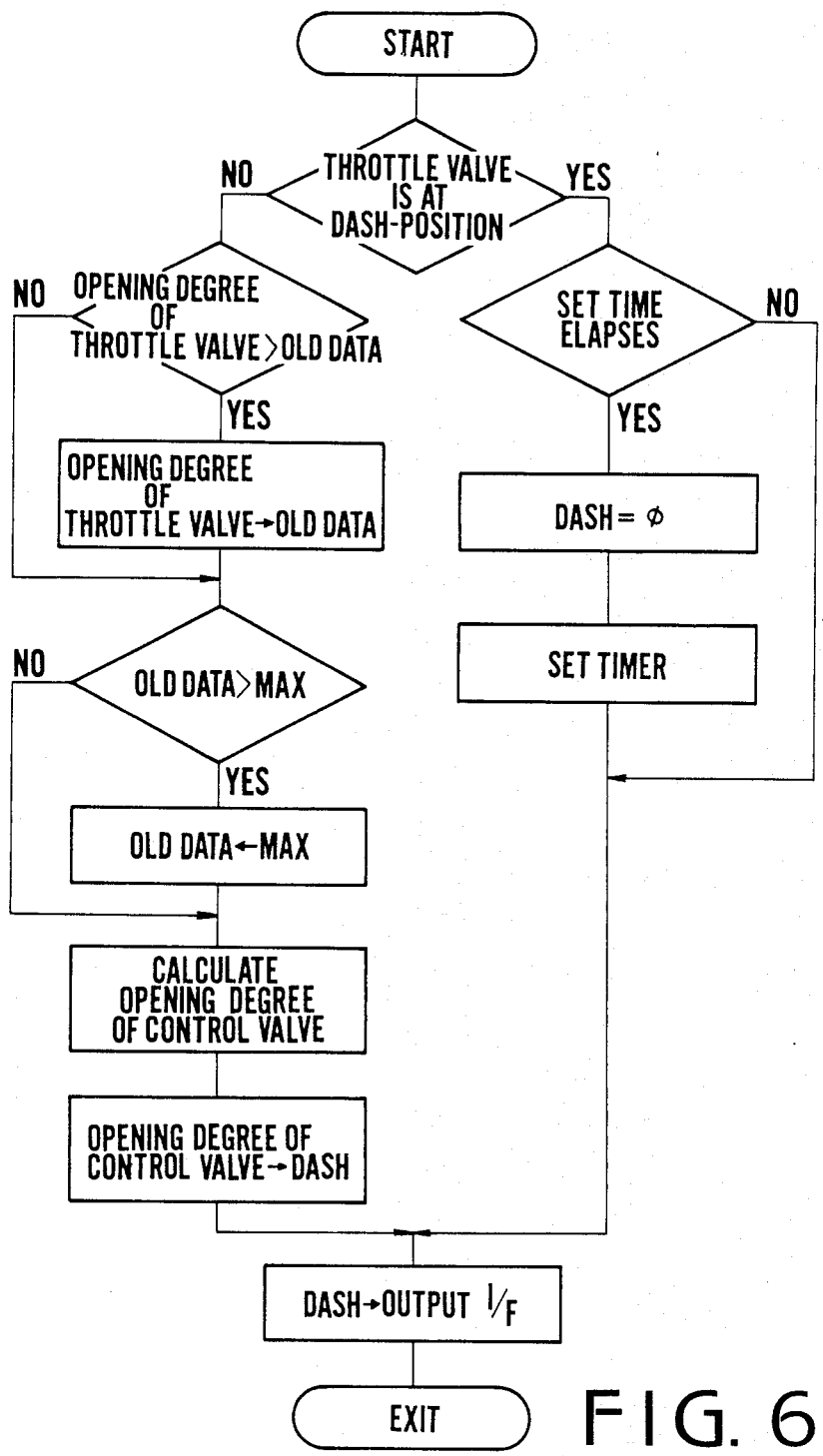

FIG. 5 shows a flowchart of the operation in FIG. 4(a). When the throttle valve is not at the dash-position, a signal of the throttle position sensor 3 at a sampling is compared with the last signal at the last sampling. When the new data is larger than the old data, which means that the opening degree of the throttle valve increases, the old data is substituted by the new data. When the opening degree of the throttle valve exceeds a value which corresponds to a maximum opening degree of the control valve 4, the old data at the sampling is stored in the RAM 104. The opening degree of the control valve 4 is calculated based on data stored in RAM 104 and ROM 103 to produce a data of DASH which is stored in the RAM, and the control valve 4 is opened to a determined position in accordance with the data of DASH. When the throttle valve is closed to the dash-position, the stored data is decreased little by little at regular intervals. Thus, the control valve is gradually closed so as to prevent an extreme enrichment of the mixture.

At the cold engine control operation, when the throttle valve is closed to the dash-position, the control valve is kept at a determined opening degree in accordance with the data of DASH for a predetermined period which is dependent on temperature. Thereafter, the control valve is closed to an idling position.

While the presently preferred embodiment of the present invention has been shown and described, it is to be understood that this disclosure is for the purpose of illustration and that various changes and modifications may be made without departing from the scope of the invention as set forth in the appended claims.

What is claimed is:

1. A system for controlling the intake air in an automotive engine having an intake passage, a throttle valve in the intake passage, and a bypass provided for bypassing the throttle valve, comprising:
   a control valve provided in the bypass to control the amount of bypassing air;
   actuating means for operating the control valve;
   means for detecting the temperature of a coolant of the engine and for producing a first temperature signal when the temperature is lower than a predetermined value and for producing a second temperature signal when the temperature of the coolant is higher than said predetermined value, respectively;
   means for detecting the position of the throttle valve and for producing a throttle position signal when the throttle valve is closed to an idle opening position;
   control means responsive to the first temperature signal and to the throttle position signal for actuating the actuating means so as to hold the control valve in an open state for a predetermined period dependent on the temperature, and thereafter to close the control valve, and
   said control means responsive to said second temperature signal and to said throttle position signal for gradually closing the control valve.

2. The system according to claim 1, wherein said open state is a constant value opening degree of said control valve during said predetermined period.

3. The system according to claim 2, wherein said constant value opening degree is dependent on a previously reached opening degree of said throttle valve.

4. A method for controlling intake air in an automotive engine having an intake passage, a throttle valve in the intake passage, a bypass bypassing the throttle valve, and a control valve provided in the bypass to control the amount of bypassing air, comprising the steps of
   detecting the temperature of coolant of the engine and producing a first temperature signal when the temperature of the coolant is lower than a predetermined value and a second temperature signal when the temperature of the coolant is higher than the predetermined value,
   detecting the position of the throttle valve and producing a throttle position signal when the throttle valve is closed to an idle opening position,
   holding the control valve in an open state for a predetermined period dependent on the temperature upon occurrence of the first temperature signal and the throttle position signal, and closing the control valve after said period, and
   gradually closing the control valve in response to said second temperature signal and to said throttle position signal.

5. A system for controlling the intake air in an automotive engine having an intake passage, a throttle valve in the intake passage, and a bypass provided for bypassing the throttle valve, comprising:
   a control valve provided in the bypass to control the amount of bypassing air;
   actuating means for operating the control valve;
   means for detecting the temperature of a coolant of the engine for producing a temperature signal when the temperature is lower than a predetermined value;
   means for detecting the position of the throttle valve and for producing a throttle position signal when the throttle valve is closed to an idle opening position; and
   means responsive to the temperature signal and to the throttle position signal for actuating the actuating means so as to hold the control valve in an open state for a predetermined period dependent on the temperature, and thereafter to close the control valve.

6. The system according to claim 5, wherein said open state is a constant value opening degree of said control valve during said predetermined period.

7. The system according to claim 6 wherein said constant value opening degree is dependent on a previously reached opening degree of said throttle value.

* * * * *